United States Patent [19]
Okinoshima et al.

[11] Patent Number: 5,314,979
[45] Date of Patent: May 24, 1994

[54] OPTICAL FIBERS AND CORE - FORMING COMPOSITIONS

[75] Inventors: Hiroshige Okinoshima; Shohei Kozakai, both of Annaka; Tomiya Abe, Hitachi, all of Japan

[73] Assignees: Shin-Etsu Chemical Co., Ltd.; Hitachi Cable Ltd., both of Tokyo, Japan

[21] Appl. No.: 803,552

[22] Filed: Dec. 9, 1991

[30] Foreign Application Priority Data

Dec. 10, 1990 [JP] Japan ................................ 2-410033
Dec. 28, 1990 [JP] Japan ................................ 2-417023

[51] Int. Cl.$^5$ ............................................. C08G 77/04
[52] U.S. Cl. ......................................... 528/15; 528/21; 528/24; 528/25; 528/26; 528/31; 385/123
[58] Field of Search ................... 385/123; 528/15, 25, 528/26, 31, 24, 21; 525/479

[56] References Cited

U.S. PATENT DOCUMENTS

| | | | |
|---|---|---|---|
| 4,477,641 | 10/1984 | Matsumoto et al. | 528/15 |
| 4,562,096 | 12/1985 | Lo et al. | 427/208.8 |
| 4,783,140 | 11/1988 | Osawa et al. | 385/123 |
| 4,826,284 | 5/1989 | Sakagami et al. | 385/123 |

FOREIGN PATENT DOCUMENTS

| | | | |
|---|---|---|---|
| 0140530 | 5/1985 | | |
| 0153414 | 9/1985 | European Pat. Off. | |
| 0171442 | 2/1986 | European Pat. Off. | |
| 204171 | 12/1986 | European Pat. Off. | 528/25 |
| 315836 | 5/1989 | European Pat. Off. | 525/479 |
| 0388092 | 9/1990 | European Pat. Off. | |
| 3843310 | 9/1989 | Fed. Rep. of Germany | 385/123 |
| 4034428 | 5/1991 | Fed. Rep. of Germany | 528/15 |
| 2321523 | 3/1977 | France | |
| 2343779 | 10/1977 | France | |
| 2449111 | 9/1980 | France | |
| 45-032631 | 10/1970 | Japan | 525/479 |
| 4-031806 | 2/1992 | Japan | 385/123 |

*Primary Examiner*—Ralph H. Dean
*Attorney, Agent, or Firm*—Birch, Stewart, Kolasch & Birch

[57] ABSTRACT

A composition comprising (A) an organopolysiloxane having a unit of the formula: $R^1SiO_{3/2}$ wherein $R^1$ is methyl, phenyl or vinyl in its molecule and having at least 0.05 alkenyl groups each directly attached to a silicon atom per silicon atom, (B) an organohydrogenpolysiloxane having at least 2 hydrogen atoms each directly attached to a silicon atom per molecule, (C) a platinum catalyst, and (D) an organosilane or organopolysiloxane of the formula: $R^2_a(R^3O)_bSiO_{(4-a-b)/2}$ wherein $R^2$ and $R^3$ are hydrogen, methyl, phenyl or vinyl maintains good light transmission in cured form when exposed to humidity and is thus suitable for forming cores of optical fibers. Similar benefits are obtained with a composition comprising components (A) and (B), (C') a platinum catalyst and/or a radical polymerization initiator, and (E) a carboxylate.

19 Claims, 1 Drawing Sheet

OPTICAL FIBERS AND CORE - FORMING COMPOSITIONS

This invention relates to an organopolysiloxane composition for use as core material for plastic optical fibers. It also relates to plastic optical fibers having a core in the form of a cured product of such a composition.

BACKGROUND OF THE INVENTION

As is well known in the art, optical fibers include glass base optical fibers using quartz glass and multi component glass as core and clad components and plastic optical fibers using plastics as core and clad components. As compared with the former, the plastic optical fibers have some drawbacks including an increased transmission loss undesirable for long distance communications, but some advantages including an increase of numerical aperture, ease of handling, and low cost.

Conventional plastic optical fibers generally include cores formed of organic polymers having high light transmittance and clads formed of highly transparent organic polymers having a lower index of refraction than the core polymers. The organic polymers having high light transmittance suitable as the core are typically poly(methyl methacrylate), polystyrene, and polycarbonate. It was recently proposed to use organopolysiloxane elastomers as the core material as disclosed in Japanese Patent Application Kokai No. 43613/1985. Advantageously, plastic optical fibers using such elastomer cores have higher flexibility and higher thermal resistance than those using poly(methyl methacrylate) and other conventional core materials.

Nevertheless, the organopolysiloxane elastomers applied as the plastic optical fiber core have a drawback that light transmission loss is increased within a short period of time when exposed to high humidity conditions. It is thus desired to eliminate this drawback.

SUMMARY OF THE INVENTION

Therefore, an object of the present invention is to provide a composition which cures into a product having a low light transmission loss even when exposed to high humidity so that the composition is highly suitable for forming optical fiber cores. Another object of the invention is to provide an optical fiber having a core in the form of a cured product of the composition.

The inventors have found that an organopolysiloxane composition comprising (A) an organopolysiloxane having a unit of formula (1):

$$R^1SiO_{3/2} \tag{1}$$

wherein $R^1$ is a substituted or unsubstituted monovalent hydrocarbon group having 1 to 10 carbon atoms in its molecule and having at least 0.05 alkenyl groups each directly attached to a silicon atom per silicon atom, (B) an organopolysiloxane having at least 2 hydrogen atoms each directly attached to a silicon atom per molecule, (C) a platinum catalyst, and (D) an organosilane or organo-polysiloxane of average compositional formula (2):

$$R^2_a(R^3O)_bSiO_{(4-a-b)/2} \tag{2}$$

wherein $R^2$ and $R^3$ are independently selected from the group consisting of a hydrogen atom and a substituted or unsubstituted monovalent hydrocarbon group having 1 to 10 carbon atoms and letters a and b are numbers in the range: $0 \leq a \leq 2$, $0 < b \leq 4$ and $0 < a+b \leq 4$ is very useful as an optical fiber core-forming composition. Plastic optical fibers having cured products of this composition as the core experience no lowering of light transmittance when exposed to high temperature/high humidity conditions for an extended period of time, presenting a minimized light transmission loss.

More particularly the organopolysiloxane composition is designed for improving humidity resistance by incorporating ($R^1SiO_{3/2}$) units, which are three-dimensional constitutional units, in the organopolysiloxane structure before curing in order to provide an increased crosslinking density, and by using an organopolysiloxane having an alkoxy group directly attached to a silicon atom ($R^3O-Si$) in order to stabilize the high light transmittance against a change of humidity.

The inventors have also found that plastic optical fibers which are resistant against heat and humidity and easy to handle can be produced by forming cores from an organopolysiloxane composition comprising components (A) and (B) as defined above, (C') a platinum catalyst and/or a radical polymerization initiator, and (E) a carboxylate of the formula (3):

$$\begin{array}{c} R_A \\ | \\ CH_2=C-COOR_B \end{array} \tag{3}$$

wherein $R_A$ is hydrogen or a methyl group and $R_B$ is hydrogen or a substituted or unsubstituted monovalent hydrocarbon group having 1 to 18 carbon atoms.

As previously described, optical fibers having silicone resin cores are generally more resistant against heat, but less resistant against humidity than optical fibers having poly(methyl methacrylate) resin cores. Unexpectedly, the inventors have discovered that a copolymeric composition composed of an organopolysiloxane compound and a carboxylate of formula (3) cures into products which are improved in both heat and humidity resistance and easy to handle.

Therefore, the present invention in the first form provides a composition for forming optical fiber cores, comprising (A) an organopolysiloxane having a unit of formula (1):

$$R^1SiO_{3/2} \tag{1}$$

wherein $R^1$ is a substituted or unsubstituted monovalent hydrocarbon group having 1 to 10 carbon atoms in its molecule and having at least 0.05 alkenyl groups each directly attached to a silicon atom per silicon atom, (B) an organopolysiloxane having at least 2 hydrogen atoms each directly attached to a silicon atom per molecule, (D) an organosilane or organopolysiloxane of average compositional formula (2):

$$R^2_a(R^3O)_bSiO_{(4-a-b)/2} \tag{2}$$

wherein $R^2$ and $R^3$ are independently selected from the group consisting of a hydrogen atom and a substituted or unsubstituted monovalent hydrocarbon group having 1 to 10 carbon atoms and letters a and b are numbers in the range: $0 \leq a \leq 2$, $0 < b \leq 4$ and $0 < a+b \leq 4$.

In a second form, the present invention provides a composition for forming optical fiber cores, comprising organopolysiloxane (A) and organopolysiloxane (B) as defined above, (C') a platinum catalyst and/or a radical polymerization initiator, and (E) a carboxylate of formula (3):

(3)

wherein $R_A$ is hydrogen or a methyl group and $R_B$ is hydrogen or a substituted or unsubstituted monovalent hydrocarbon group having 1 to 18 carbon atoms.

Preferably, organopolysiloxane (A) has a silanol group, and the silanol group in the organopolysiloxane is present in an amount of at least 0.02 mol per 100 grams of the total weight of components (A) and (B). The composition contains about 0.5 to about 50% by weight of the composition of carboxylate (E).

Also contemplated is an optical fiber comprising a core and a cladding thereon, the core being formed of a cured product of a composition as defined above.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
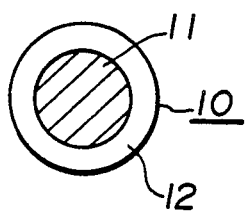
FIG. 1 is a cross section of an optical fiber according to the present invention.

Component (A) of the core-forming organopolysiloxane composition according to the present invention is an organopolysiloxane having a three dimensional constitutional unit of the formula:

$$R^1SiO_{3/2} \qquad (1)$$

in its molecule and an alkenyl group directly attached to a silicon atom for increasing crosslinking density. The organopolysiloxane has at least 0.05 alkenyl groups per silicon atom. It preferably has a silanol group in addition to the alkenyl group.

In the three dimensional constitutional unit of formula (1), $R^1$ is a substituted or unsubstituted monovalent hydrocarbon group having 1 to 10 carbon atoms, for example, alkyl groups such as methyl, ethyl and propyl; alkenyl groups such as vinyl, allyl and hexenyl; cycloalkyl groups such as cyclohexyl; aryl groups such as phenyl, tolyl, and xylyl; aralkyl groups such as benzyl and phenylethyl; and halogenated monovalent hydrocarbon groups such as tetra. chlorophenyl, chlorophenyl, chloromethyl, pentafluorobutyl, and trifluoropropyl; with the methyl, phenyl and vinyl groups being preferred. The proportion of these substituents is not particularly limited. Preferably, the three dimensional constitutional units, of formula (1) are contained in the organopolysiloxane of component (A) in a proportion of about 30 to 80 mol%, more preferably about 40 to 70 mol%. The other units may be selected from $R^1_2SiO$, $R^1_3SiO_{\frac{1}{2}}$, and $SiO_2$ wherein $R^1$ is as defined above. $R^1$ groups may be identical or different.

The organopolysiloxane as component (A) cures through addition crosslinking reaction with the hydrogen atom directly attached to a silicon atom of the organopoly. siloxane as component (B) or (D) in the presence of the platinum catalyst or radical polymerization initiator as component (C) or (C'). Therefore, the organopolysiloxane as component (A) should contain alkenyl groups each directly attached to a silicon atom, for example, vinyl, allyl and acryl groups in such an amount that at least 0.05 alkenyl groups, preferably 0.15 to 0.5 alkenyl groups are present per silicon atom. Outside the range, curing is retarded or in extreme cases, disturbed.

For humidity resistance improvement and copolymerizing ability, the organopolysiloxane as component (A) preferably has a silanol group (SiOH) in an amount of at least 0.02 mol, more preferably at least 0.04 mol per 100 grams of the total weight of components (A) and (B). If the content of silanol group is less than 0.02 mol on this basis, the resulting copolymers would become less resistant against humidity. This range of silanol group content is particularly essential for the composition containing component (E).

Examples of the organopolysiloxane as component (A) includes those of the following average compositional formulae.

In the formulae, Me is methyl, Vi is vinyl, Ph is phenyl, letters a through e are positive numbers of less than 1.

These organopolysiloxanes may be prepared by well-known techniques by co-hydrolysis of organohalosilanes or organo-alkoxysilanes corresponding to the respective constitutional units in the above-listed formulae.

Component (B) of the core-forming organopolysiloxane composition according to the present invention is an organopolysiloxane having at least 2 hydrogen atoms each directly attached to a silicon atom per molecule, that is, an organohydrogensiloxane. Component (B) is a component for forming a cured product through addition crosslinking reaction with the alkenyl groups in the organopolysiloxane as component (A) or (D) or for enabling copolymerization through addition reaction with a carboxylate as component (E). The proportion of the alkenyl group in the component (A) organopolysiloxane to the hydrogen atom directly attached to a silicon atom in the component (B) organopoly-siloxane is not particularly limited insofar as the curing purpose is accomplished. The proportion preferably ranges from 10/1 to 1/10, more preferably from 5/1 to 1/5 in molar ratio.

The organopolysiloxane as component (B) is generally represented by the formula:

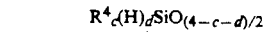

wherein $R^4$ is a substituted or unsubstituted mcnovalent $C_{1-10}$ hydrocarbon group as defined for $R^1$ excluding alkenyl groups, letter c is a number of from 1 to 2.5, and d is a number of from 0.001 to 1, and c+d is from 1 to 3. The organic group other than the hydrogen atom and attached to a silicon atom is not particularly limited insofar as it is monovalent, with substituted or unsubstituted monovalent hydrocarbon groups being preferred. Examples of the substituted or unsubstituted monovalent hydrocarbon groups include alkyl groups, aralkyl groups, and halogenated monovalent hydrocarbon groups having 1 to 10 carbon atoms as previously described for $R^1$ in component (A), more preferably methyl and phenyl.

The molecular structure of the organopolysiloxane as component (B) is not particularly limited insofar as it is compatible with the organopolysiloxane as component (A). It may have any of well-known linear, cyclic, branched and network structures. It may have a viscosity ranging from a low value of less than 10 cs (centistoke) at 25° C. to a high value of more than 1000 cs at 25° C. Since less viscous organopolysiloxane compositions are convenient for the manufacture of optical fibers, the organopolysiloxane as component (B) should preferably have a low viscosity of up to 1000 cs at 25° C. so that the overall composition has a relatively low viscosity.

Component (C) of the core-forming organopolysiloxane composition according to the present invention is a platinum catalyst for promoting formation of crosslinking bonds through addition reaction between silicon-bonded alkenyl groups in the organopolysiloxanes as components (A) and (D) and silicon-bonded hydrogen atoms in the organopolysiloxane as component (B), thereby reducing the curing time. Platinum black and chloroplatinic acid are typical examples of the platinum base catalyst. In order that the catalyst be dissolved in the organopolysiloxanes, use of alcohol and silicone-modified chloroplatinic acid solutions is preferred. The platinum catalyst as component (C) is used in a catalytic amount. Since the platinum left in the core can adversely affect the light transmission of optical fibers, the amount of platinum catalyst should be as small as possible. Thus the platinum catalyst is preferably used in an amount to give 5 ppm or less, more preferably 1 ppm or less of elemental platinum based on the total weight of components (A), (B) and (D). Less than 0.01 ppm would be too small for effective curing.

Component (D) is an organosilane or organopolysiloxane of the following average compositional formula (2) having an alkoxy group directly attached to a silicon atom ($R^3$O-Si) in a molecule.

$$R^2{}_a(R^3O)_bSiO_{(4-a-b)/2} \qquad (2)$$

In formula (2), $R^2$ and $R^3$ are independently selected from the group consisting of a hydrogen atom and a substituted or unsubstituted monovalent hydrocarbon group having 1 to 10 carbon atoms. Examples of the hydrocarbon group are as illustrated for $R^1$. It is to be noted that $R^2$ and $R^3$ may contain an alkenyl group (e.g., vinyl, allyl, and acryl) capable of addition crosslinking reaction with a hydrogen atom directly attached to a silicon atom of the organopoly. siloxane (B) in the presence of a platinum catalyst (C). Also $R^2$ and $R^3$ may contain a hydrogen atom capable of addition reaction with an alkenyl group of the organopoly siloxane (A) in the presence of a platinum catalyst (C). Most preferably, $R^2$ is hydrogen, methyl, ethyl, phenyl or vinyl and $R^3$ is methyl or ethyl.

Letters a and b are numbers in the range: $0 \leq a \leq 2$, $0 < b \leq 4$ and $0 < a+b \leq 4$, preferably $0 \leq a \leq 1$, $1 \leq b \leq 4$ and $1 < a+b \leq 4$ for humidity resistance improvement.

The molecular structure of the organosilane or organopolysiloxane as component (D) is not particularly limited insofar as it is compatible with the organopoly. siloxane (A). It may have any of well-known linear, cyclic, branched and network structures. It may have a viscosity ranging from a low value of less than 10 cs at 25° C. to a high value of more than 1000 cs at 25° C. Since less viscous organopolysiloxane compositions are convenient for the manufacture of optical fibers, the organosilane or organo. polysiloxane (D) should preferably have a low viscosity of up to 1000 cs at 25° C. so that the overall composition has a relatively low viscosity.

Examples of the organosilane or organopolysiloxane as component (D) includes those of the following average compositional formulae.

I. $[(MeO)_3SiO_{0.5}]_a[(MeO)_2SiO]_b[MeO)SiO_{1.5}]_c[SiO_2]_3$ ii. $[(MeO)_3SiO_{0.5}]_a[Me(MeO)_2SiO_{0.5}]_b[(MeO)_2SiO]_c$-$[Me(MeO) SiO]_d[(MeO)SiO_{1.5}]_e[MeSiO_{1.5}]_f[SiO_2]_g$ iii. $[(MeO)_3SiO_{0.5}]_a[Vi(MeO)_2SiO_{0.5}]_b[(MeO)_2SiO]_c$-$[Vi(MeO) SiO]_d[(MeO)SiO_{1.5}]_e[ViSiO_{1.5}]_f[SiO_2]_g$ iv. $[(MeO)_3SiO_{0.5}]_a[Ph(MeO)_2SiO_{0.5}]_b[(MeO)_2Si$-$O]_c[Ph(MeO) SiO]_d[(MeO)SiO_{1.5}]_e[PhSiO_{1.5}]_f[SiO_2]_g$ v. $[(MeO)_3SiO_{0.5}]_a[Me_2(MeO)SiO_{0.5} {}_b[(MeO)_2SiO]_c$-$[Me_2SiO]_d[(MeO)SiO_{.15}]_e[SiO_2]_f$ vi. $[(MeO)_3SiO_{0.5}]_a[MeVi(MeO)SiO_{0.5}]_b[(MeO)_2SiO]_c$-$[MeVisiO]_d[(MeO)SiO_{1.5}]_e[SiO_2]_f$ vii. $[(EtO)_3SiO_{0.5}]_a[(EtO)_2SiO]_b[(EtO)SiO_{1.5}]_c[SiO_2]_d$ viii. $[(EtO)_3SiO_{0.5}]_a[MeVi(EtO)SiO_{0.5}]_b[(EtO)_2SiO]_c$-$[MeVisiO]_d[(MeO)SiO_{1.5}]_e[SiO_2]_f$ ix. $[(MeO)_3SiO_{0.5}]_a[H(MeO)_2SiO_{0.5}]_b[(MeO)_2SiO]_c[H$-$(MeO)SiO]_d[(MeO)SiO_{1.5}]_e[HSiO_{1.5}]_f[SiO_2]_g$ x. $[(MeO)_3SiO_{0.5}]_a[MeH(MeO)SiO_{0.5}]_b[(MeO)_2SiO]_c$-$[MeHSiO]_d[(MeO)SiO_{1.5}]_e[SiO_2]_f$ xi. $[(EtO)_3SiO_{0.5}]_a[MeH(EtO)SiO_{0.5}]_b[(EtO)_2SiO]_c$-$[MeHSiO]_d[(MeO)SiO_{1.5}]_e[SiO_2]_f$ In the formulae, Me is methyl, Et is ethyl, Vi is vinyl, Ph is phenyl, letters a through g are positive numbers of less than 1, and the total of the letters in each formula is equal to 1.

These organosilanes and organopolysiloxanes may be prepared by well-known techniques by co-hydrolysis of organoalkoxysilanes corresponding to the respective constitutional units in the above-listed formulae.

Component (D) may be blended in an amount of about 0.5 to 50% by weight, preferably about 5 to 20% by weight based on the total weight of the composition. Less than about 0.5% by weight of component (D) would be insufficient to improve humidity resistance whereas heat resistance would lower with more than about 50% by weight of component (D).

In the second form of the present invention, the core-forming composition is defined as comprising organopoly. siloxane components (A) and (B) defined above, (C') a platinum catalyst and/or a radical polymerization initiator, and (E) a carboxylate of formula (3).

$$\underset{CH_2=C-COOR_B}{\overset{R_A}{|}} \qquad (3)$$

The carboxylates of formula (3), which are typically acrylates and methacrylates, are copolymerizable with the organopolysiloxanes, thus contributing to humidity resistance improvement.

In formula (3), $R_A$ is hydrogen or a methyl group and $R_B$ is hydrogen or a substituted or unsubstituted monovalent hydrocarbon group having 1 to 18 carbon atoms, for example, alkyl groups such as methyl, ethyl and propyl; alkenyl groups such as vinyl, allyl and hexenyl; cycloalkyl groups such as cyclohexyl; aryl groups such as phenyl, tolyl, and xylyl; aralkyl groups such as benzyl and phenylethyl; and halogenated monovalent hydrocarbon groups such as tetra. chlorophenyl, chlorophenyl, chloromethyl, pentafluorobutyl, and trifluoropropyl.

The carboxylate (E) may be blended in an amount of about 0.5 to 50% by weight, preferably about 1 to 30% by weight based on the total weight of the composition. Less than about 0.5% by weight of carboxylate (E) would be insufficient to improve humidity resistance whereas more than about 50% by weight of carboxylate (E) would not copolymerize to a substantial extent, rendering the core less transparent.

The core-forming composition in the second form of the invention is obtained through copolymerization reaction of a resin composition containing the organosiloxanes and the carboxylate. This reaction can be promoted by appropriate energy such as heat and ultraviolet light if a platinum catalyst or radical polymerization initiator is present in the reaction system. Examples of the platinum catalyst are platinum black and chloroplatinic acid as previously mentioned. Examples of the radical polymerization initiator include oxides such as benzoyl peroxide, dicumyl peroxide, and lauroyl peroxide, and azo compounds such as asobis. isobutyronitrile and azobis(2,4-dimethylvaleronitrile). Often about 0.01 to about 5 parts by weight of the radical polymerization initiator is used per 100 parts by weight of the total of components (A), (B), and (E). A mixture of a platinum catalyst and a radical polymerization initiator is also useful.

The core-forming organopolysiloxane composition according to the present invention is comprised of components (A), (B), (C), and (D) in the first form or (A), (B), (C'), and (E) in the second form as defined above. In a composition prepared by mixing these components, due to the catalysis of the platinum catalyst, addition reaction of components (A) and (B) with component (D) or (E) can take place even at room temperature and this addition reaction proceeds quickly at elevated temperatures. In this regard, a reaction inhibitor may be added if desired for ease of working. Examples of the reaction inhibitor include acetylene alcohols, 3-methyl-3-butyn 2-ol, 2-methyl-1-pentyl-3-ol, 3,5-dimethyl-1-hexyn-3-ol, 2,5-dimethyl-3-hexyne-2,5-diol, 3,6-dimethyl-4-octyne-3,6-diol, and 2,4,7,9-tetramethyl-5-decyne-4,7-diol. The amount of the inhibitor added is not particularly limited and may be suitably selected for a particular set of working conditions.

The core-forming composition of the invention is molded into a fibrous shape by conventional well-known techniques as by simply mixing the components and introducing into a tube under pressure, and then heated for curing to produce an optical fiber core. The preferred curing conditions include a temperature of about 100° to about 150° C. and a time of about 3 hours or longer.

One embodiment of the optical fiber according to the present invention is shown in the cross section of FIG. 1. The optical fiber 10 has a core 11 of a circular cross section and a concentric clad 12 enclosing the core. The core 11 is a cured one of the composition of the invention. The clad 12 may be formed from any desired one of well-known plastic materials. Preferred clads are of polymers having a lower index of refraction than the index of refraction of the core, especially lower by at least 1%. Exemplary are fluorinated polymers such as polytetrafluoroethylene, tetrafluoroethylene/perfluoroalkylvinylether copolymers, tetrafluoroethylene/hexafluoropropylene copolymers, polychlorotrifluoroethylene, tetrafluoroethylene/ethylene copolymers, polyvinyl fluoride, polyvinylidene fluoride, and tetrafluoroethylene/vinylidene fluoride copolymers, 4-methyl-1-pentene polymers, organosiloxane polymers, fluorinated acrylate or methacrylate polymers, polyamide resins, polyimide resins, polyamidimide resins, epoxy resins, polyvinyl chloride resins, and polyesters.

Silicone type plastic optical fibers having a core in the form of a cured product of the composition of the present invention experience a minimal rise of light transmission loss when exposed to high humidity. The ability to maintain a high light transmittance stably against humidity changes, together with inherent flexibility and thermal resistance, widens the range of application of plastic optical fibers.

EXAMPLE

Examples of the present invention are given below together with comparative examples by way of illustration and not by way of limitation. All parts are by weight. In the formulae, Me is methyl, Et is ethyl, Vi is vinyl, and Ph is phenyl.

EXAMPLE 1

An organopolysiloxane having an alkenyl group and an organopolysiloxane having an alkoxy group were synthesized as follows.

Synthesis of alkenyl-containing organopolysiloxane

A flask was charged with 108.9 grams (0.55 mol) of phenyltrimethoxysilane, 39.6 grams (0.30 mol) of methyl. vinyldimethoxysilane, and 18 grams (0.15 mol) of dimethyl dimethoxysilane and cooled to below 5° C. To the solution, 114.5 grams of 20% hydrochloric acid aqueous solution was added dropwise at a temperature of less than 30° C. The reaction solution was stirred for 1 hour at room temperature and then 2 hours at 60.70° C. The reaction solution was combined with 110 grams of toluene and 110 grams of 10% sodium sulfate aqueous solution and the organic layer was then separated.

The organic layer was washed with 10% sodium sulfate aqueous solution until neutral. After azeotroping off water at 110°–120° C. for 2 hours, the organic solution was cooled to 40° C. and combined with 52 grams of toluene and 0.025 grams of potassium hydroxide. The mixture was heated to 110°–120° C. at which temperature condensation polymerization took place for 4 hours while azeotroping off water. Then the reaction solution was cooled down to room temperature, combined with 0.12 grams of trimethylchlorosilane, stirred for one hour, and washed with 10% sodium sulfate aqueous solution until neutral. The reaction solution was dried over anhydrous sodium sulfate, filtered, and removed of the toluene by heating in vacuum, yielding polysiloxane A of the following average compositional formula having $PhSiO_{3/2}$ units and vinyl groups.

$$[PhSiO_{3/2}]_{0.55}[ViMeSiO]_{0.33}[Me_2SiO]_{0.15} \qquad (4)$$

Synthesis of alkoxy-containing organopolysiloxane

A flask was charged with 124.8 grams (0.6 mol) of tetraethoxysilane, 76 grams (0.4 mol) of vinyltriethoxysilane, and 0.21 grams of 35% hydrochloric acid and cooled to below 10° C. To the solution, a mixture of 43.2 grams of ethanol and 14.4 grams of water was added dropwise at a temperature of below 40° C. The mixture was heated at 50°-60° C. for 1 hour and then cooled down to room temperature, was stirred for 1 hour for mixing and neutralization. The reaction mixture was heated in vacuum to 100° C./5 mmHg, obtaining 117 grams of organopolysiloxane D-1 of the following average compositional formula having ethoxy groups.

$$Vi_{0.4}(MeO)_{0.4}(EtO)_{1.8}SiO_{0.8} \tag{5}$$

Preparation of organopolysiloxane composition

An organopolysiloxane composition was prepared by mixing 65.0 parts of the vinyl-containing organopolysiloxane (A), 10 parts of the ethoxy-containing organopolysiloxane (D-1), and 25 parts of an organohydrogenpolysiloxane having a hydrogen atom attached to a silicon atom of formula (6) shown below.

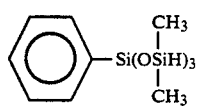

An octyl alcohol-modified chloroplatinic acid solution was added to the mixture in an amount to give 1 ppm of elemental platinum based on the weight of the mixture.

EXAMPLE 2

Synthesis of alkoxy-containing organopolysiloxane

The corresponding procedure of Example 1 was repeated using 91.2 grams (0.6 mol) of tetramethoxysilane, 59.2 grams (0.4 mol) of vinyltrimethoxysilane, 0.18 grams of 35% hydrochloric acid, 43.2 grams of methanol, and 14.4 grams of water. There was obtained 110 grams of organopolysiloxane D-2 of the following average compositional formula having methoxy groups.

$$Vi_{0.4}(MeO)_2SiO_{0.8} \tag{7}$$

Preparation of organopolysiloxane composition

An organopolysiloxane composition was prepared by mixing 64.3 parts of the vinyl-containing organopolysiloxane (A), 10 parts of the methoxy-containing organopolysiloxane (D-2), and 25.7 parts of the organohydrogenpolysiloxane of formula (6) used in Example 1 and adding an octyl alcohol modified chloroplatinic acid solution to the mixture in an amount to give 1 ppm of elemental platinum based on the weight of the mixture.

EXAMPLE 3

An organopolysiloxane composition was prepared by mixing 69.9 parts of the vinyl-containing organopolysiloxane (A), 5 parts of the methoxy-containing organopolysiloxane (D-2), and 25.1 parts of the organohydrogenpolysiloxane of formula (6) used in Example 1 and adding an octyl alcohol-modified chloroplatinic acid solution to the mixture in an amount to give 1 ppm of elemental platinum based on the weight of the mixture.

EXAMPLE 4

An organopolysiloxane composition was prepared by mixing 74.3 parts of the vinyl-containing organopolysiloxane (A), 1 parts of the methoxy-containing organopolysiloxane (D-2), and 24.7 parts of the organohydrogenpolysiloxane of formula (6) used in Example 1 and adding an octyl alcohol-modified chloroplatinic acid solution to the mixture in an amount to give 1 ppm of elemental platinum based on the weight of the mixture.

EXAMPLE 5

An organopolysiloxane composition was prepared by mixing 74.9 parts of the vinyl-containing organopolysiloxane (A), 0.5 parts of the methoxy-containing organopolysiloxane (D-2), and 24.6 parts of the organohydrogenpolysiloxane of formula (6) used in Example 1 and adding an octyl alcohol-modified chloroplatinic acid solution, to the mixture in an amount to give 1 ppm of elemental platinum based on the weight of the mixture.

COMPARATIVE EXAMPLE 1

An organopolysiloxane composition was prepared by mixing 75.0 parts of the vinyl-containing organopolysiloxane (A) and 24.6 parts of the organohydrogenpolysiloxane of formula (6) used in Example 1 and adding an octyl alcohol-mcdified chloroplatinic acid solution to the mixture in an amount to give 1 ppm of elemental platinum based on the weight of the mixture.

The organopolysiloxane compositions of Examples 1.5 and Comparative Example 1 were then forcedly introduced into fluoride resin tubes having an inner diameter of 1.5 mm and an outer diameter of 2.2 mm, and cured therein by heating at 100° C. for 6 hours and then at 150° C. for 24 hours, obtaining optical fibers.

The optical fibers were subjected to the following heat and humidity tests. The quantity of light transmitted by the fibers was measured before and after the test using light of 660 nm. The results are shown in Table 1.

Heat resistance

The optical fibers are exposed at 150° C. for 1,000 hours and then allowed to stand at room temperature for 2 hours before light quantity measurement.

Humidity resistance

The optical fibers were exposed to a humid environment at 70° C. and RH 95% for 1,000 hours and then allowed to stand at room temperature for 2 hours before light quantity measurement.

TABLE 1

| | Alkoxy-containing organopolysiloxane | | Light quantity retention (%) | | |
|---|---|---|---|---|---|
| | Type | Content (wt %) | Initial | 150° C./ 1000 hr. | 70° C./RH 95%/ 1000 hr. |
| E1 | D1 | 10 | 100 | 94 | 66 |
| E2 | D-2 | 10 | 100 | 96 | 71 |
| E3 | D-2 | 5 | 100 | 96 | 69 |
| E4 | D-2 | 1 | 100 | 98 | 52 |
| E5 | D-2 | 0.5 | 100 | 98 | 33 |
| CE1 | — | — | 100 | 98 | 0 |

Examples 6-14 & Comparative Examples 2-4

Twelve core-forming compositions of Examples 6-14 and comparative Examples 2-4 were prepared as described later. Using these compositions, optical fibers of the double structure shown in FIG. 1 as comprising a clad 12 surrounding a core 11 were fabricated.

The optical fibers were examined for initial transmission loss and humidity resistance by the following tests.

Transmission loss

Figure 2:
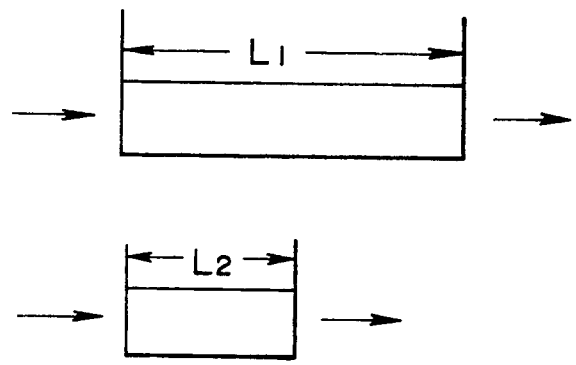
FIG. 2 schematically illustrates a test method for measuring transmission loss.

Light transmission performance was evaluated in terms of the magnitude of transmission loss a by the cut-back method. First an optical fiber having a length L1 (m) as shown in FIG. 2 was used. Light of a predetermined wavelength spectrally selected from a halogen lamp light source through a monochrometer was directed to the optical fiber of length L1 at one end and the quantity of light P1 (W) transmitted by the fiber was measured at the other end. Next, the optical fiber was cut to a length L2 (m) as shown in FIG. 2. Similarly, light was directed to the optical fiber of length L2 at one end and the quantity of light P2 (W) transmitted by the fiber was measured at the other end. Transmission loss a (dB/m) was calculated by the following equation.

$$a = \frac{10 \log(P2/P1)}{L1 - L2}$$

In this test, the wavelength was 660 nm, L1=5 m, and L2=1 m.

Humidity resistance

Humidity resistance was evaluated in terms of light quantity retention. The optical fibers were placed in a constant temperature/constant humidity chamber at 60° C. and RH 90% for a predetermined time, taken out of the chamber, and allowed to stand for 30 minutes. Using LED light of 660 nm, the quantity of light transmitted by the fibers was measured. Light quantity retention (%) was calculated by the following equation.

$$\text{light quantity retention} = \frac{\text{light quantity after test}}{\text{initial light quantity}} \times 100\%$$

It is now described how to formulate the compositions of Examples and Comparative Examples and how to fabricate optical fibers therefrom.

The organopolysiloxanes used as component (A) were those of average compositional formulae (8) and (9) and the organosiloxane used as component (B) was an organohydrogen. siloxane of formulae (10). They are abbreviated as organopolysiloxane (8) and so on.

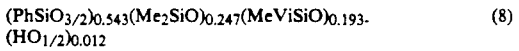(8)

(PhSiO$_{3/2}$)$_{0.543}$(Me$_2$SiO)$_{0.247}$(MeViSiO)$_{0.193}$-(HO$_{1/2}$)$_{0.012}$

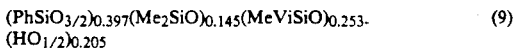(9)

(PhSiO$_{3/2}$)$_{0.397}$(Me$_2$SiO)$_{0.145}$(MeViSiO)$_{0.253}$-(HO$_{1/2}$)$_{0.205}$

(10)

$$\underset{\underset{\text{Me}}{|}}{\overset{\overset{\text{Me}}{|}}{\text{PhSi(OSiH)}_3}}$$

EXAMPLE 6

A core-forming organopolysiloxane composition (or core precursor) was prepared by mixing 52.2 parts of organopoly-siloxane (8), 20.3 parts of organopolysiloxane (9), 17.5 parts of organohydrogensiloxane (10), 0.05 parts of lauroyl peroxide, and 10 parts of methyl methacrylate, and adding an octyl alcohol-modified chloroplatinic acid solution to the mixture in an amount to give 0.9 ppm of elemental platinum based on the weight of the mixture.

The organopolysiloxane composition was then forcedly introduced into a tube of tetrafluoroethylene/hexafluoro-propylene copolymer having an inner diameter of 1.5 mm and an outer diameter of 2.2 mm as a clad, and cured therein by heating at 120° C. for 1 hour and then at 150° C. for 5 hours, obtaining an optical fiber.

EXAMPLE 7

A core-forming organopolysiloxane composition was prepared by mixing 52.2 parts of organopolysiloxane (8), 20.3 parts of organopolysiloxane (9), 17.5 parts of organo-hydrogensiloxane (10), 0.05 parts of lauroyl peroxide, and 10 parts of benzyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

EXAMPLE 8

A core-forming organopolysiloxane composition was prepared by mixing 52.2 parts of organopolysiloxane (8), 20.3 parts of organopolysiloxane (9), 17.5 parts of organo. hydrogensiloxane (10), 0.05 parts of lauroyl peroxide, and modified chloroplatinic acid solution to the mixture in an amount to give 0.9 ppm of elemental platinum based on the weight of the mixture. An optical fiber was obtained from the organopolysiloxane composition as in Example 6.

EXAMPLE 9

A core-forming organopolysiloxane composition was prepared by mixing 52.2 parts of organopolysiloxane (8), 20.3 parts of organopolysiloxane (9), 17.5 parts of organo-hydrogensiloxane (10), 0.05 parts of lauroyl peroxide, and 10 parts of 2,2,2-trifluoroethyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

EXAMPLE 10

A core-forming organopolysiloxane composition was prepared by mixing 52.2 parts of organopolysiloxane (8), 20.3 parts of organopolysiloxane (9), 17.5 parts of organo-hydrogensiloxane (10), 0.05 parts of lauroyl peroxide, and 10 parts of n-butyl acrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

EXAMPLE 11

A core-forming organopolysiloxane composition was prepared by mixing 40.6 parts of organopolysiloxane (8), 15.8 parts of organopolysiloxane (9), 13.6 parts of organohydrogensiloxane (10), 0.05 parts of lauroyl peroxide, and 25 parts of methyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

EXAMPLE 12

A core-forming organopolysiloxane composition was prepared by mixing 70.2 parts of organopolysiloxane (8), 4 parts of organopolysiloxane (9), 15.8 parts of organo hydrogensiloxane (10), 0.05 parts of lauroyl peroxide, and 10 parts of methyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

EXAMPLE 13

A core-forming organopolysiloxane composition was prepared by mixing 52.2 parts of organopolysiloxane (8), 20.3 parts of organopolysiloxane (9), 17.5 parts of organohydrogensiloxane (10), and 10 parts of methyl methacrylate, and adding an octyl alcohol modified chloroplatinic acid solution to the mixture in an amount to give 1 ppm of elemental platinum based on the weight of the mixture. An optical fiber was obtained from the organopoly. siloxane composition as in Example 6.

EXAMPLE 14

A core-forming organopolysiloxane composition was prepared by mixing 52.2 parts of organopolysiloxane (8), 20.3 parts of organopolysiloxane (9), 17.5 parts of organo-hydrogensiloxane (10), 0.05 parts of lauroyl peroxide, and 10 parts of methyl- methacrylate. An optical fiber was obtained from the organopolysiloxane composition as in Example 6.

COMPARATIVE EXAMPLE 2

A core-forming organopolysiloxane composition was prepared by mixing 29 parts of organopolysiloxane (8), 11.3 parts of organopolysiloxane (9), 9.7 parts of organo-hydrogensiloxane (10), 0.05 parts of lauroyl peroxide, and 60 parts of methyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

COMPARATIVE EXAMPLE 3

A core-forming organopolysiloxane composition was prepared by mixing 57.9 parts of organopolysiloxane (8), 22.5 parts of organopolysiloxane (9), 19.4 parts of organo-hydrogensiloxane (10), 0.01 parts of lauroyl peroxide, and 0.2 parts of methyl methacrylate, and adding an octyl alcohol-modified chloroplatinic acid solution to the mixture in an amount to give 0.9 ppm of elemental platinum based on the weight of the mixture. An optical fiber was obtained from the organopolysiloxane composition as in Example 6.

COMPARATIVE EXAMPLE 4

A core-forming organopolysiloxane composition was prepared by mixing 58 parts of organopolysiloxane (8), 22.6 parts of organopolysiloxane (9), and 19.4 parts of organo. hydrogensiloxane (10), and adding an octyl alcohol-modified chloroplatinic acid solution to the mixture in an amount to give 1 ppm of elemental platinum based on the weight of the mixture. An optical fiber was obtained from the organopoly. siloxane composition as in Example 6.

For these Examples and Comparative Examples, Table 2 reports the content of component (E) or carboxylate based on the composition (% by weight), the content of silanol group in the organosiloxanes based on the composition (mol/100 grams of composition), the initial transmission loss of the optical fiber (dB/m), and the retention of light quantity transmitted by the optical fiber after 1,000-hour storage at 60° C. and RH 90% (%).

TABLE 2

| | Component (E) (wt%) | Silanol content (mol/100 g) | Initial transmission loss (dB/m) | Light quantity retention (%) |
|---|---|---|---|---|
| E6 | 10 | 0.06 | 0.8 | 85 |
| E7 | 10 | 0.06 | 0.8 | 78 |
| E8 | 10 | 0.06 | 0.9 | 83 |
| E9 | 10 | 0.06 | 0.9 | 79 |
| E10 | 10 | 0.06 | 0.7 | 88 |
| E11 | 25 | 0.06 | 1.7 | 95 |
| E12 | 10 | 0.02 | 2.0 | 52 |
| E13 | 10 | 0.06 | 1.2 | 70 |
| E14 | 10 | 0.06 | 1.5 | 66 |
| CE2 | 60 | 0.06 | — | — |
| CE3 | 0.2 | 0.06 | 0.6 | 30 |
| CE4 | 0 | 0.06 | 0.8 | <10 |

As seen from Table 2, the optical fibers of Examples showed relatively small initial transmission losses and well retained light quantity whereas the optical fibers of Comparative Examples could not retain the light quantity after the high temperature/high humidity test. Especially, the optical fiber of Comparative Example 1 had an opaque core by which no light could be transmitted.

Figure 3:
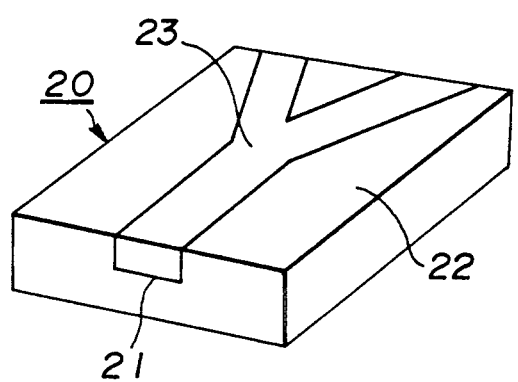
FIG. 3 is a perspective view of a Y-branched optical waveguide according to another embodiment of the present invention.

FIG. 3 perspectively illustrates a Y-branched optical waveguide formed from a core-forming composition within the scope of the present invention. The waveguide 20 is fabricated by injection molding poly(4-methyl-1-pentene) into a substrate 22 having a Y-shaped channel 21, casting a core-forming composition (e.g., of Example 6) into the channel 21, and heating at 120° C. for 10 hours. A core 23 results from the core precursor composition being cast into the channel and heated for in situ curing. The Y-branched optical waveguide 20 could retain satisfactory optical waveguide function even after 1,000-hour storage at 60° C. and RH 90% (%).

The optical fibers obtained from the core-forming composition of the present invention are improved in heat resistance and humidity resistance and easy to handle, allowing for a wider variety of uses to which synthetic resin optical fibers are applicable.

Although some preferred embodiments have been described, many modifications and variations may be made thereto in the light of the above teachings. It is therefore to be understood that within the scope of the appended claims, the invention may be practiced otherwise than as specifically described.

We claim:

1. A composition for forming optical fiber cores, comprising
   (A) an organopolysiloxane having a unit of formula (1):

$$R^1 SiO_{3/2} \tag{1}$$

wherein $R^1$ is an unsubstituted monovalent hydrocarbon group having 1 to 10 carbon atoms in its molecule or a halogenated derivative thereof and has at least 0.05 alkenyl groups, each directly attached to a silicon atom, per silicon atom, (B) an organopolysiloxane having at least 2 hydrogen atoms each directly attached to a silicon atom per molecule, (C') a platinum catalyst or a radical polymerization initiator or both, and (E) a carboxylate of formula (3):

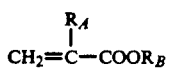

$$CH_2=\overset{R_A}{\underset{|}{C}}-COOR_B \qquad (3)$$

wherein $R_A$ a hydrogen or a methyl group and $R_B$ is hydrogen an unsubstituted monovalent hydrocarbon group having 1 to 18 carbon atoms or a halogenated monovalent hydrocarbon group having 1 to 18 carbon atoms;

wherein said carboxylate (E) is contained in an amount of about 0.5 to about 50% by weight based on the total weight of the composition.

2. The composition according to claim 1, wherein the organopoly-siloxane as component (A) further has a silanol group, and the silanol group in said organopolysiloxane is present in an amount of at least 0.02 mol per 100 grams of the total weight of components (A) and (B).

3. The composition according to claim 1, wherein said carboxylate (E) is contained in an amount of about 1 to 30% by weight based on the total weigh of the composition.

4. The composition according of claim 1, wherein $R_B$ is a member selected from the group consisting of methyl, ethyl, propyl, vinyl, allyl, hexenyl, cyclohexyl, phenyl, tolyl, xylyl, benzyl, penyltheyl, tetrachlorophenyl, chlorophenyl, chloromethyl, partafluorobutyl and trifluoropeopyl.

5. The composition according to claim 1, wherein said carboxylate of formula (3) is selected from the group consisting of methyl methacrylate, benzylmethacrylate, ethyl methacrylate, 2,2,2-trifluoroethyl methacrylate, and n-butyl acrylate.

6. The composition according to claim 1, wherein said component (C') comprises a platinum catalyst selected from platinum black or chloroplatinic acid.

7. The composition according to claim 1, wherein said component (C') comprises a radical polymerization initiator selected from eh group consisting of benzoyl peroxide, dicumyl peroxide, lauroyl peroxide, asobisisobutyronitrile, and azxobis (2,4-dimethylvaleronitrile).

8. The composition according to claim 1, wherein said radical polymerization initiator of component (C') is contained in an amount of about 0.01 to about 5 parts by weight per 100 parts by weight of the total of components (A), (B), and (E).

9. The composition according to claim 1, wherein component (C') comprises both a platinum catalyst and a radical polymerization initiator.

10. The composition according to claim 1, wherein the molar ratio of said alkenyl groups in the organopolysiloxane of component (A) to the hydrogen atoms directly bonded to silicon atoms in the organopolysiloxane of component (B) is in the range of 10:1 to 1:10.

11. The composition according to claim 10, wherein said molar ratio is in the range of 5:1 to 1:5.

12. The composition according of claim 1, wherein said organopolysiloxane of component (A) is comprised of about 30 to 80 mol% of said units of formula (1).

13. The composition according to claim 1, wherein said organopolysiloxane of component (A) is comprised of about 40 to 70 mol% of said units of formula (1).

14. The composition according to claim 1, wherein said alkenyl groups contained in the organopolysiloxane of component (A) are contained in an amount of 0.15 to 0.5 alkenyl groups per silicon atom.

15. The composition according to claim 1, wherein said organopolysiloxane of component (A) further contains a silanol group on an amount of at least 0.04 mol per 100 grams of the total weight of components (A) and (B).

16. An optical fiber comprising a core and a clad thereon, wherein said core comprises the cured product of the composition as set forth in claim 1 or 2.

17. An optical fiber comprising a core and a clad thereon, wherein said core comprises the cured product of the composition as set forth in claim 5.

18. An optical fiber comprising a core and a clad thereon, wherein said core comprises the cured product of the composition as set forth in claim 11.

19. An optical fiber comprising a core and a clad thereon, wherein said core comprises the cured product of the composition as set forth in claim 15.

* * * * *